United States Patent
Hasan et al.

(10) Patent No.: US 11,516,122 B2
(45) Date of Patent: Nov. 29, 2022

(54) VALIDATING ACTIVE AND INACTIVE PATHS IN A MULTIPROTOCOL LABEL SWITCHING (MPLS) NETWORK

(71) Applicant: Ciena Corporation, Hanover, MD (US)

(72) Inventors: Khandaker Rafiul Hasan, Stittsville (CA); Xiang Ji, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/235,093

(22) Filed: Apr. 20, 2021

(65) Prior Publication Data
US 2022/0337516 A1    Oct. 20, 2022

(51) Int. Cl.
*H04L 45/50* (2022.01)
*H04L 45/28* (2022.01)

(52) U.S. Cl.
CPC .............. *H04L 45/50* (2013.01); *H04L 45/28* (2013.01)

(58) Field of Classification Search
CPC . H04L 43/08; H04L 43/0805; H04L 43/0811; H04L 43/0817; H04L 43/10; H04L 43/12; H04L 43/50; H04L 43/55; H04L 45/50; H04L 45/52; H04L 45/20; H04L 45/22; H04L 45/28; H04L 47/17; H04L 47/265
See application file for complete search history.

(56) References Cited

U.S. PATENT DOCUMENTS

| | | | |
|---|---|---|---|
| 7,031,607 B1 | 4/2006 | Aswood Smith | |
| 7,412,168 B2 | 8/2008 | Aswood Smith | |
| 9,210,075 B2 | 12/2015 | Bhattacharya | |
| 9,313,121 B2 | 4/2016 | Swinkels et al. | |
| 9,350,605 B2 | 5/2016 | Bhattacharya et al. | |
| 9,407,359 B2 | 8/2016 | Swinkels et al. | |
| 9,485,171 B2 | 11/2016 | Mishra et al. | |
| 9,667,559 B2 | 5/2017 | Bhattacharya | |

(Continued)

FOREIGN PATENT DOCUMENTS

| EP | 2 983 329 B1 | 11/2017 |
|---|---|---|
| EP | 2 933 977 B1 | 6/2019 |

OTHER PUBLICATIONS

K. Kompella et al., "Detecting Multiprotocol Label Switched (MPLS) Data-Plane Failures," Internet Engineering Task Force (IETF), Category: Standards Track, ISSN: 2070-1721, Mar. 2017, pp. 1-78.

*Primary Examiner* — Kan Yuen
(74) *Attorney, Agent, or Firm* — Clements Bernard Baratta; Lawrence A. Baratta, Jr.; Christopher L. Bernard

(57) ABSTRACT

Systems and methods for detecting, testing, and validating inactive paths or backup/protection paths of Label Switched Paths (LSPs) in a Multiprotocol Label Switching (MPLS) network are provided. A method, according to one implementation, includes the step of identifying an active path defining a traffic route along which data packets are transmitted from an ingress node to an egress node via one or more intermediate nodes. The method also includes sending an echo request from the ingress node to the one or more intermediate nodes, wherein the echo request allows the one or more intermediate nodes to detect and validate one or more inactive paths. The one or more inactive paths are configured as one or more protection paths when an event is detected that impedes the transmission of the data packets along the active path.

15 Claims, 7 Drawing Sheets

(56) References Cited

U.S. PATENT DOCUMENTS

| | | | |
|---|---|---|---|
| 10,027,762 B2 | 7/2018 | Moynihan et al. | |
| 11,165,695 B1* | 11/2021 | P | H04L 45/28 |
| 2002/0150041 A1* | 10/2002 | Reinshmidt | H04L 45/22 |
| | | | 370/216 |
| 2005/0047390 A1* | 3/2005 | Park | H04L 45/48 |
| | | | 370/351 |
| 2006/0250948 A1* | 11/2006 | Zamfir | H04L 45/22 |
| | | | 370/216 |
| 2011/0013517 A1* | 1/2011 | So | H04L 45/04 |
| | | | 370/238 |
| 2014/0198634 A1* | 7/2014 | Kumar | H04L 45/22 |
| | | | 370/228 |
| 2014/0355424 A1* | 12/2014 | Rao | H04L 47/12 |
| | | | 370/228 |
| 2015/0288602 A1 | 10/2015 | Bragg et al. | |
| 2016/0352628 A1* | 12/2016 | Reddy | H04L 12/4633 |
| 2018/0097725 A1* | 4/2018 | Wood | H04L 45/02 |
| 2019/0379596 A1 | 12/2019 | Sharma et al. | |
| 2020/0162364 A1 | 5/2020 | Chhabra et al. | |
| 2020/0162374 A1* | 5/2020 | Gautam | H04L 45/28 |

\* cited by examiner

VALIDATING ACTIVE AND INACTIVE PATHS IN A MULTIPROTOCOL LABEL SWITCHING (MPLS) NETWORK

TECHNICAL FIELD

The present disclosure generally relates to networking systems and methods. More particularly, the present disclosure relates to not only validating active paths of a Multiprotocol Label Switching (MPLS) network but also validating inactive paths of the MPLS network.

BACKGROUND

Multiprotocol Label Switching (MPLS) networks typically include an "active path," which may also be referred to as a "primary path," "working path," or other similar terminology for referring to a preferred path or route along which data packets will normally be transmitted. In addition to this active path, an MPLS network will normally include at least one "inactive path," which may also be referred to as a "protection path," "secondary path," "backup path," "alternate path," or other similar terminology for referring to a path or route along which the data packets can be transmitted if there are any issues with the active (primary) path. Thus, traffic is initially configured to be transmitted over the active (primary) path. However, if some event is detected along the active path (e.g., a fault, excessive congestion, link disconnection, maintenance of an associated router or link, etc.), which would impede the proper transmission of data packets over the active path, the MPLS network may be configured to switch from the active path to one of the available inactive (protection) paths. Therefore, the protection paths, which may normally be configured as "inactive," can be utilized for backup when needed.

Label-switched paths (LSPs) (or MPLS tunnels) may be configured as point-to-point routes through an MPLS network. LSPs may include both an active path and one or more inactive paths. An LSP begins at a Label Edge Router (LER) (or LSP ingress router), which may be configured to add a prefix label to a data packet. The LER forwards the data packet to a next router in the path. This next router swaps the packet's outer label for another label, forwards the packet to the next router, and so on. The last router in the LSP (e.g., egress LSP router) removes the label from the packet and forwards the packet according to further routing instructions.

An inactive LSP (e.g., inactive path) may serve as a protection path for any segment in the LSP. This path may be used to protect a node, a link, a segment, or the whole LSP. When a network event happens and the active path is down, local protection processes of network control systems may be configured to quickly switch to the protection path to allow traffic to continue to be carried through the LSP.

Request for Comments 8029 (RFC 8029) of the Internet Engineering Task Force (IETF) (and other related standards and protocols) defines ways to detect MPLS data plane failures for active data paths. For example, RFC 8029 describes protocols for MPLS "ping" operations and "traceroute" operations, as well "multipath" discover (e.g., tree trace) for testing LSPs in an MPLS system. Some conventional systems may include implementations to test individual Resource Reservation Protocol (RSVP) Fast Re-Routing (FRR) protection path starting from an individual Point of Local Repair (PLR) or other local repair node.

However, according to conventional implementations, RFC 8029 is based on ping and traceroute operations that can only check the active path of an LSP and are unable to check inactive paths, which may be applicable to RSVP FRR protection paths, Generalized MPLS (GMPLS) backup paths, Segment Routing (SR) Topology-Independent Loop-Free Alternate (TI-LFA) FRR protection paths, etc. In a real MPLS network, not only is it possible for active paths to experience problems, but inactive (protection) paths can also have problems as well. Without a way to validate these inactive paths, a false negative scenario may arise for the protection paths, which can cause network outage when the active path is down and the one or more protection paths are unable to carry data traffic as a backup measure.

FIG. 1 is a diagram illustrating MPLS label headers as used in conventional systems. For example, a headend node 10 may be configured to transmit data packets having an MPLS label header 12 to one or more downstream nodes 14. The MPLS label header 12 includes an Internet Protocol (IP) header, a User Datagram Protocol (UDP) header, and an MPLS echo "request" 16. Each of the downstream nodes 14 may be configured to transmit an MPLS label header 18 back to the headend node 10. The MPLS label header 18 includes an IP header, a UDP header, and an MPLS echo "reply" 20.

The MPLS echo request 16 and the MPLS echo reply 20 can be used for ping operations, traceroute operations, and/or multi-path (e.g., tree trace) operations, which are defined in RFC8029 for testing an active path from an initiator node to an ingress node (e.g., headend node 10) to an egress node via, which may include one or more of the downstream nodes. Therefore, the downstream nodes 14 shown in FIG. 1 may be the egress node and/or one or more intermediate nodes. In this solution, a Time-to-Live (TTL) value may be used in the MPLS label header 12 for defining how many hops it takes to reach an intermediate node (e.g., one of the downstream nodes 14 between the headend node 10 and the egress node).

MPLS echo requests 16 transmitted to downstream nodes 14 and MPLS echo replies 20 transmitted as reply messages back to the headend node 10 are defined in RFC8029 using a Type, Length, Value (TLV) data format. The TLV data can be repeated when needed. Also, some TLV data can be embedded into other TLV data as "sub-TLV" data.

FIG. 2 is a diagram illustrating the data format of a message 24, which may represent the message associated with either or both of the MPLS echo request 16 and the MPLS echo reply 20 shown in FIG. 1. The message 24 includes one or more Downstream Detailed Mapping (DD-MAP) TLV data sets 26. Each DDMAP TLV data set 26 includes Downstream Router and Interface (DRI) sub-TLV data sets. For example, each DRI sub-TLV data set 28 may include Downstream (DS) flags, DS address, DS interface, return code, return code, etc.

However, as mentioned above, RFC 8029 and other conventional systems are unable to validate inactive paths. Although some conventional solutions have attempted to resolve some of the issues in the prior art, they too have shortcomings of their own. For example, some solutions may allow the testing of individual protection paths, but such testing must start from each individual Point of Local Repair (PLR), which may be a locally node being repaired. As a result, the conventional solutions will normally have the following limitations:

1. A network operator would need to know which paths are protection paths for each node along the LSP. Also, each path to be checked must have a handle (e.g., an unofficial identification) that serves the LSP ingress router for ping and traceroute operations. Finding all the applicable protection paths therefore would not be an easy job, because there could be multiple protection types where some might protect the incoming flow while others might protect only one specific outgoing path. With Equal-Cost Multi-Path (ECMP) routing strategies in place, this solution will be even more complex. It would be difficult to automate such a process, and thus the network operator would need to find all the nodes along the LSP first, dump the protection information, find the right protection tunnel from each node, and then test them. In this case, there is no way to test all protection paths from a single node (e.g., the LSP ingress router or head-end node).

2. The conventional solutions would only be applicable to RSVP FRR and MPLS Transport Profile (MPLS-TP) tunnel protection situations. As such, the network operator would need to figure out all the Facility Bypass (FB) tunnels and backup tunnels to test them individually. When there is no explicit path handle with a dedicated name or ID provided for the protection path, which uses hardware and software resources, then this solution does not work. For example, in a Segment Routing (SR) TI-LFA protection case, the backup path would be an auto-generated adjacency and label stack, which may not have an Operations, Administration, and Management (OAM) handle at all. The conventional solutions would only able to validate the inactive path itself, and it is unable to validate that the inactive path can actually protect the active path end to end, from the active path's ingress point to active path's egress point.

3. When ECMP is present, it is difficult for the network operator to figure out all possible backup paths from every hop of every ECMP path.

Therefore, RFC 8029 is configured to define techniques for detecting MPLS data-plane failures with respect to an active (primary) path. However, as suggested above, RFC 8029 does not allow for testing to be performed on inactive/protection/backup paths. There is therefore a need in the field of MPLS network to not only enable testing and validation of active paths, but also enable testing and validation of inactive paths as well. As such, when available backup paths are needed, a network operator can be assured that the backup paths have been tested for validity and are properly ready to stand in for performing protection functionality as intended.

BRIEF SUMMARY

The present disclosure is directed to systems, methods, non-transitory computer-readable media, Network Management Systems (NMSs), etc. for enabling the detection, testing, and validation of active and inactive paths through a network, such as a Multiprotocol Label Switching (MPLS) network. In some respects, the embodiments described herein may be configured as an extension of RFC 8029 to include not only validation of active paths, but also the validation of inactive paths.

According to one embodiment, an NMS includes a processing device and a memory device configured to store a computer program having instructions that, when executed, enable the processing device to perform certain functions. For example, the instructions may enable the processing device to identify an active path defining a traffic route along which data packets are transmitted from an ingress node to an egress node via one or more intermediate nodes. Furthermore, the instructions may enable the processing device to send an echo request from the ingress node to the one or more intermediate nodes. The echo request allows the one or more intermediate nodes to detect and validate one or more inactive paths, where the one or more inactive paths are configured as one or more protection paths when an event is detected that impedes the transmission of the data packets along the active path.

In addition, the active path and one or more inactive paths may be Label Switched Paths (LSPs) in a Multiprotocol Label Switched (MPLS) network. Validating the one or more inactive paths may be part of an LSP Validation (LSPV) process. The echo request may be configured to request the one or more intermediate nodes to perform an MPLS ping procedure, an MPLS traceroute procedure, or an MPLS multi-path discovery procedure. In some embodiments, the echo request may include a Time to Live (TTL) value to identify a specific intermediate node at which detection and validation procedures are performed for detecting and validating an inactive path of the one or more inactive paths.

Furthermore, the NMS may be further configured such that the instructions further enable the processing device to receive an echo reply back from the one or more intermediate nodes. The echo reply may include one or more Downstream Detailed Mapping (DDMAP) fields having Type, Length, Value (TLV) data sets and one or more Downstream Router and Interface (DRI) sub-TLV data sets embedded in each of the DDMAP TLV data sets. The DRI sub-TLV data sets may include a Downstream (DS) flag designated as an inactive path indicator. The DRI sub-TLV data sets may include return code values related to validation results of an inactive path validation test.

The NMS described above may also be defined whereby the instructions include an extension of the Request for Comments 8029 (RFC 8029) to enable the processing device to detect and validate the one or more inactive paths. The detection and validation of the one or more inactive paths may be triggered at either the ingress node or at one of the intermediate nodes. In some cases, the ingress node, egress node, and one or more intermediate nodes may be configured as routers.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
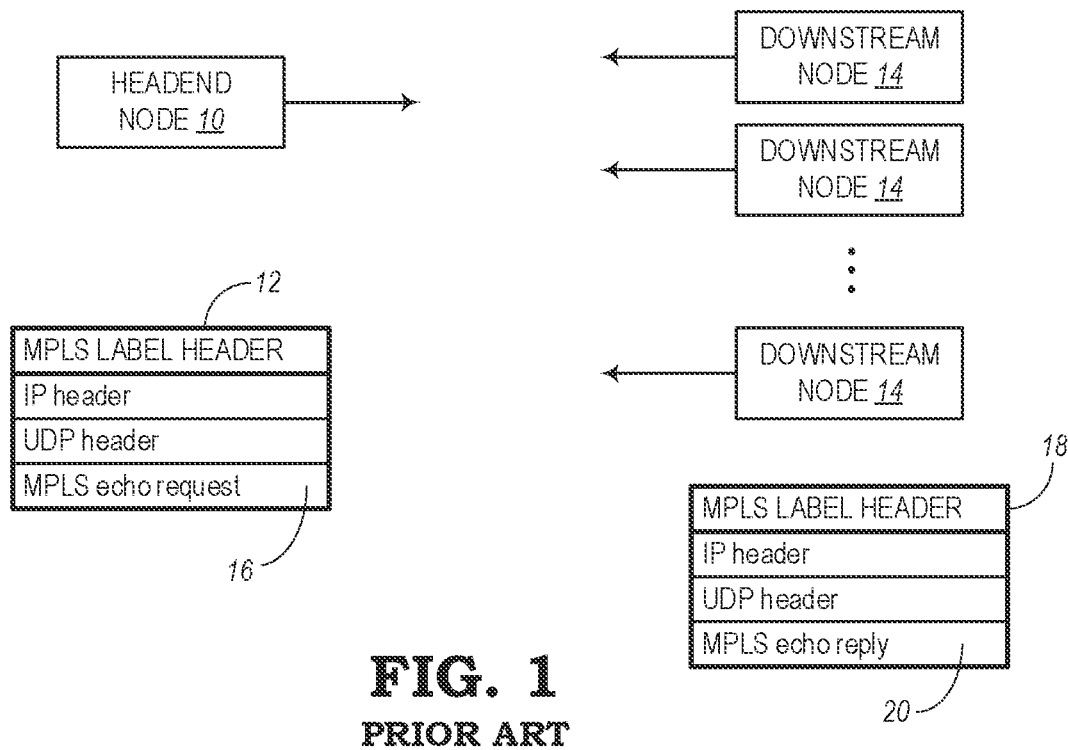
FIG. 1 is a diagram illustrating Multiprotocol Label Switching (MPLS) label headers used in conventional systems.

The present disclosure relates to systems and methods for extending the Request for Comments 8029 (RFC 8029) that utilizes Label Switched Path (LSP) routing techniques for performing "ping" and "traceroute" operations in a Multi-protocol Label Switched (MPLS) network. Since RFC 8029 only defines detection and validation of primary or active paths, the systems and methods of the present disclosure are configured to extend RFC 8029 to enable the testing and validation of inactive paths as well. Inactive paths as defined in the present disclosure refer to those paths that are not necessarily the active (primary) path along which data packets are intended to traverse but are made available for use as a protection path, secondary path, backup path, etc. in certain situations (e.g., when the primary path is down, when a fault is detected along the primary path, when the primary path is congested with excessive data traffic, etc.).

The embodiments described in the present disclosure are capable of more effectively testing and validating both the active path and one or more inactive paths, as well as the capability of the inactive path can protect the active path. As such, the network operator can make sure the protection path can really be used for protection when the active path is down, unavailable, or no longer the preferred path for other reasons.

The systems and methods of the present disclosure are configured to automatically detect and test any protection path or segment directly from an LSP head end device (e.g., router, switch, node, etc.) without the need to go to each transit node individually (as is required by conventional systems). Also, the present disclosure is configured to support the "ping" mode of RFC 8029 to detect and test inactive LSPs from a user-specified hop. The present disclosure is also configured to support "traceroute" mode to detect and test inactive LSPs for every hop. Furthermore, the present disclosure is configured to support multi-path discovery (e.g., tree trace) mode to detect and test inactive LSPs for all possible protection paths in the network.

In some embodiments, the systems and methods may be enabled as an option on top of legacy MPLS Operations, Administration, and Management (OAM) tools, such as MPLS ping, traceroute, and tree trace. The systems and methods of the present disclosure is able to support all protection types, including, for example, a) user configured backup paths for MPLS Transport Profile (MPLS-TP) backup tunnels, MPLS Traffic Engineering (MPLS-TE) tunnel protection LSPs, Segment Routing (SR) policy inactive paths, etc., b) next hop independently signaled backup paths (e.g., MPLS-TP auto backup tunnels), c) local signaled protection path (e.g., Resource Reservation Protocol (RSVP) Fast Re-Routing (FRR) Facility Bypass (FB) tunnel), d) locally computed protection path (e.g., Topology-Independent Loop-Free Alternate (TI-LFA) protection path), etc.

In the present disclosure, MPLS echo request and reply messages define in RFC 8029 may use the Type, Length, Value (TLV) data structure. TLV data can be repeated when needed. Also, TLV data can be embedded into other TLV fields as sub-TLV data. The present disclosure is configured to also extend the various data formats to include additional Downstream Detail Mapping (DDMAP) TLV data sets and Downstream Router and Interface (DRI) sub-TLV data sets according to various implementations.

LSP ping/traceroute may be referred to as LSP Validation (LSPV) and can be used to validate paths in the network, even inactive paths as described according to the various embodiments of the present disclosure. Although conventional systems can only validate active paths from the LSP head end, the embodiments of the present disclosure are able to extend the conventional strategies to enable validation of inactive (protection) paths, which can be present at the LSP head end or any transit node. From the LSP head end, the embodiments described herein are able to validate both an active path and one or more inactive (protection) paths in an MPLS network. Such validation can be triggered from an ingress or LSP head end node of the active/inactive paths. MPLS ping, traceroute, and multi-path discovery modes for Equal-Cost Multi-Path (ECMP) (e.g., tree trace) may be used as tools that can be implemented for LSPV. Also, the present disclosure is able to detect and validate multiple backup paths out of every hop of every ECMP path of a given LSP.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Network Management System

Figure 3:
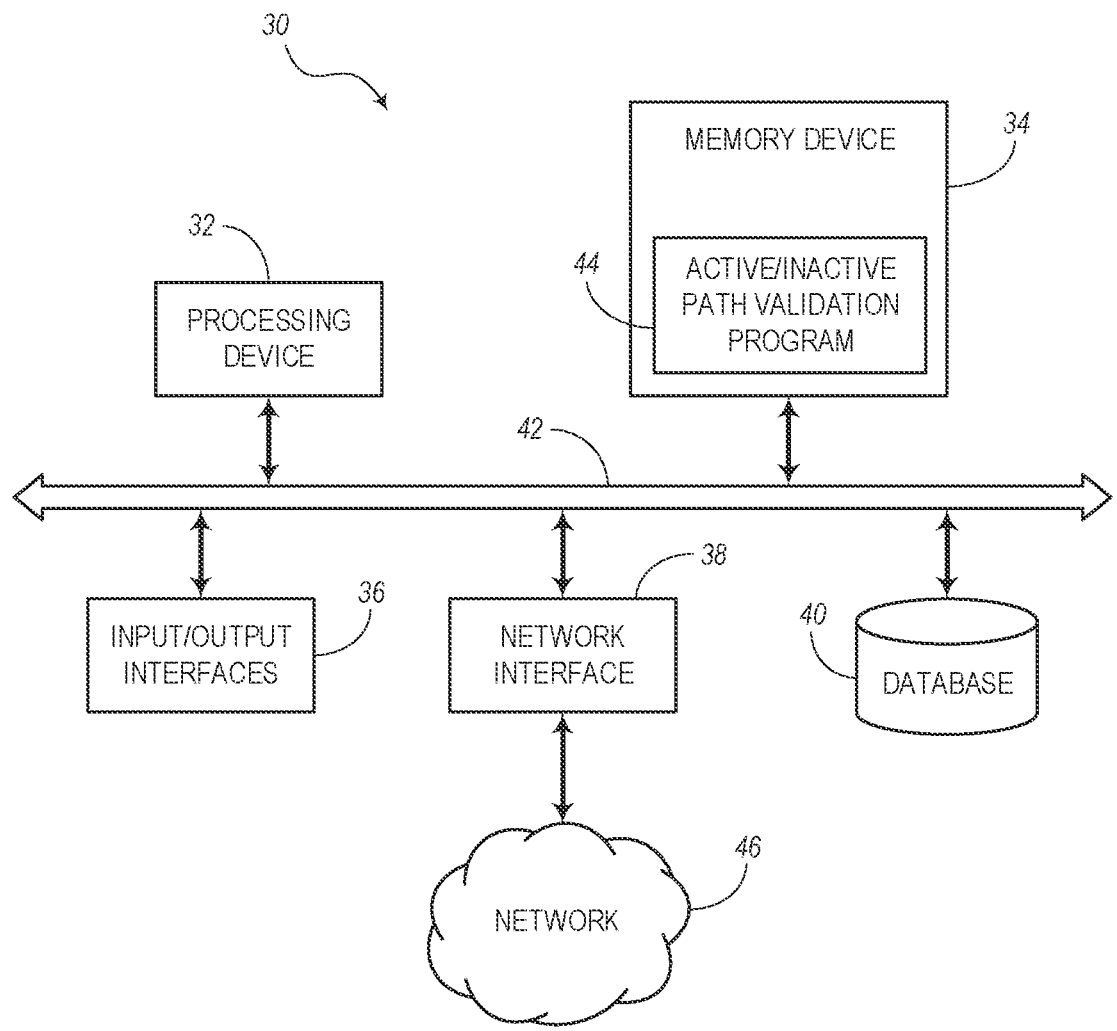
FIG. 3 is a schematic diagram illustrating a Network Management System (NMS) for validating active and inactive paths, according to various embodiments of the present disclosure.

FIG. 3 is a schematic diagram illustrating an embodiment of a Network Management System (NMS) 30 for validating active and inactive paths of an MPLS network 46. In the illustrated embodiment, the NMS 30 may be a digital computing device that generally includes a processing device 32, a memory device 34, Input/Output (I/O) interfaces 36, a network interface 38, and a database 40. It should be appreciated that FIG. 3 depicts the NMS 30 in a simplified manner, where some embodiments may include additional components and suitably configured processing logic to support known or conventional operating features. The components (i.e., 32, 34, 36, 38, 40) may be communicatively coupled via a local interface 42. The local interface 42 may include, for example, one or more buses or other wired or wireless connections. The local interface 42 may also include controllers, buffers, caches, drivers, repeaters, receivers, among other elements, to enable communication. Further, the local interface 42 may include address, control, and/or data connections to enable appropriate communications among the components 32, 34, 36, 38, 40.

It should be appreciated that the processing device 32, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 32 may also include or utilize stored program instructions (e.g., stored in hardware, software, and/or firmware) for control of the NMS 30 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/ or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 34 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 34 may incorporate electronic, magnetic, optical, and/or other types of storage media. The memory device 34 may have a distributed architecture, where various components are situated remotely from one another, but can be accessed by the processing device 32.

The memory device 34 may include a data store, database (e.g., database 40), or the like, for storing data. In one example, the data store may be located internal to the NMS 30 and may include, for example, an internal hard drive connected to the local interface 42 in the NMS 30. Additionally, in another embodiment, the data store may be located external to the NMS 30 and may include, for example, an external hard drive connected to the Input/ Output (I/O) interfaces 36 (e.g., SCSI or USB connection). In a further embodiment, the data store may be connected to the NMS 30 through a network and may include, for example, a network attached file server.

Software stored in the memory device 34 may include one or more programs, each of which may include an ordered listing of executable instructions for implementing logical functions. The software in the memory device 34 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 32), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 32 or other suitable circuitry or logic). For example, when executed, the instructions may cause or enable the processing device 32 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., the processing device 32), or any suitable combination thereof. Software/firmware modules may reside in the memory device 34, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 36 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 36 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 38 may be used to enable the NMS 30 to communicate over a network, such as the MPLS network 46, the Internet, a Wide Area Network (WAN), a Local Area Network (LAN), and the like. The network interface 38 may include, for example, an Ethernet card or adapter (e.g., 10BaseT, Fast Ethernet, Gigabit Ethernet, 10

GbE) or a Wireless LAN (WLAN) card or adapter (e.g., 802.11a/b/g/n/ac). The network interface 38 may include address, control, and/or data connections to enable appropriate communications on the MPLS network 46.

The NMS 30 may include an active/inactive path validation program 44 configured to validate an active path of an MPLS network (e.g., MPLS network 46) and also validate one or more inactive paths of the MPLS network. According to various embodiments, the active/inactive path validation program 44 may be implemented in hardware, software, or firmware, and/or in any suitable combination of hardware, software, and firmware. When implemented in software and/or firmware, the active/inactive path validation program 44 may be configured as non-transitory computer-readable instructions stored in a suitable non-transitory computer-readable medium or memory (e.g., memory device 34). When implemented in hardware, the active/inactive path validation program 44 may be configured as an ASIC and incorporated in the processing device 32. In operation, the active/inactive path validation program 44 may be configured to enable or cause the processing device 32 to perform certain instructions to validate both the active and inactive paths in an LSP of the MPLS network 46.

The present disclosure expands RFC 8029 to allow additional data to be inserted in the MPLS echo request message used by ping, traceroute, or ECMP tree trace. The additional data in this regard can be used to instruct a specified node in the LSP to discover and report local inactive paths via a newly established data field, as defined herein, into the MPLS echo request message. In this way, the inactive path can be tested from a ping or traceroute initiator.

Expanding the MPLS Echo Request/Reply TLVs to Support Inactive Paths

Figure 2:
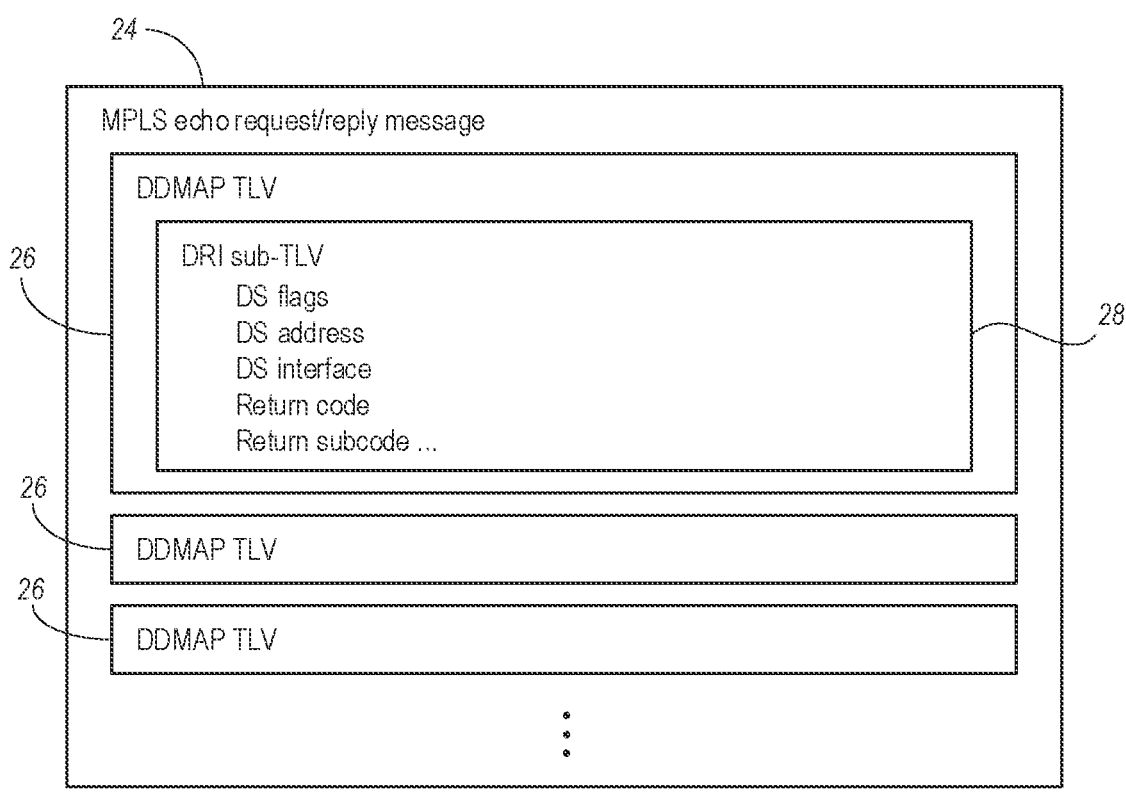
FIG. 2 is a diagram illustrating a data format of a message associated with the MPLS echo request or MPLS echo reply shown in FIG. 1.

Information can be encoded in many other ways, such as by creating new TLV types within the MPLS echo/reply message format or data structure. According to various embodiments, the data format for communicating data packets, MPLS headers, LSP headers, requests, replies, etc. may be changed from the conventional format shown in FIG. 2 to include additional information for use by the active/inactive path validation program 44 to test and validate active paths and inactive paths.

For example, in some embodiments, the data format may be changed by expanding the Downstream Detailed Mapping (DDMAP) TLV to code the information for both MPLS echo response messages and MPLS echo reply messages. In some embodiments TLV may include additional TLV data embedded therein. In this case, the embedded data may be referred to as "sub-TLV" data. Therefore, the data formats/structures may include, for example, various types of values of TLVs, sub-TLVs, flags, return codes, etc. Also, while hardware forwarding in conventional routers normally only allows for one inactive path for protection, the present disclosure allows for an extension of the data formats/structures to handle more complex protection models, either implanted by hardware forwarding or software forwarding.

MPLS Echo Requests

Figure 4:
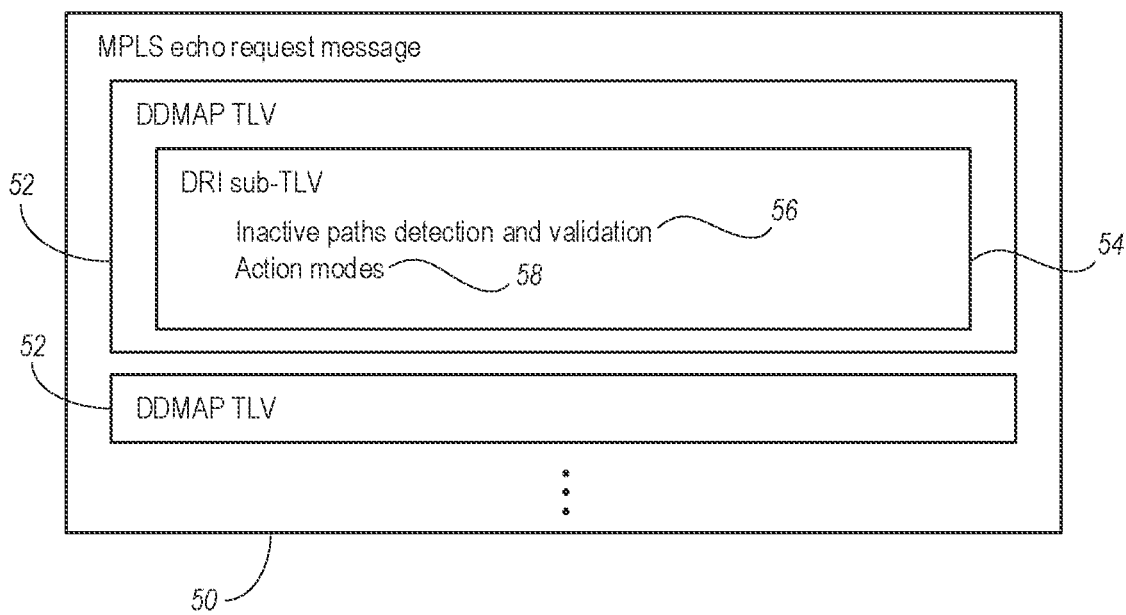
FIG. 4 is a diagram illustrating a data format of a MPLS echo request message, according to various embodiments of the present disclosure.

FIG. 4 is a diagram illustrating an embodiment of a data format of a MPLS echo request message 50. Similar to the data format of the MPLS echo request/reply message 24 shown in FIG. 2, the MPLS echo request message 50 of FIG. 4 includes one or more DDMAP TLV data sets 52. However, in addition to the DDMAP TLV data included in the MPLS echo request message 24, the MPLS echo request message 50, as described with respect to various implementations of the present disclosure, further includes new Downstream Router and Interface (DRI) sub-TLV data sets 54.

In particular, the sub-TLV data set 54 shown in FIG. 4 includes "inactive paths detection and validation" data 56 and "action modes" data 58. For example, the inactive paths detection and validation data 56 may have one of the following values:
 0: no inactive path detection or validation
 1: detect inaction path only
 2: detect and test inactive path
 3—detect and test the inactive path till LSP egress point
With the MPLS echo request message 50, the systems and methods of the present disclosure are able to expand regular MPLS echo "request" messages to enable a request for inactive path discovery and validation.

Figure 5:
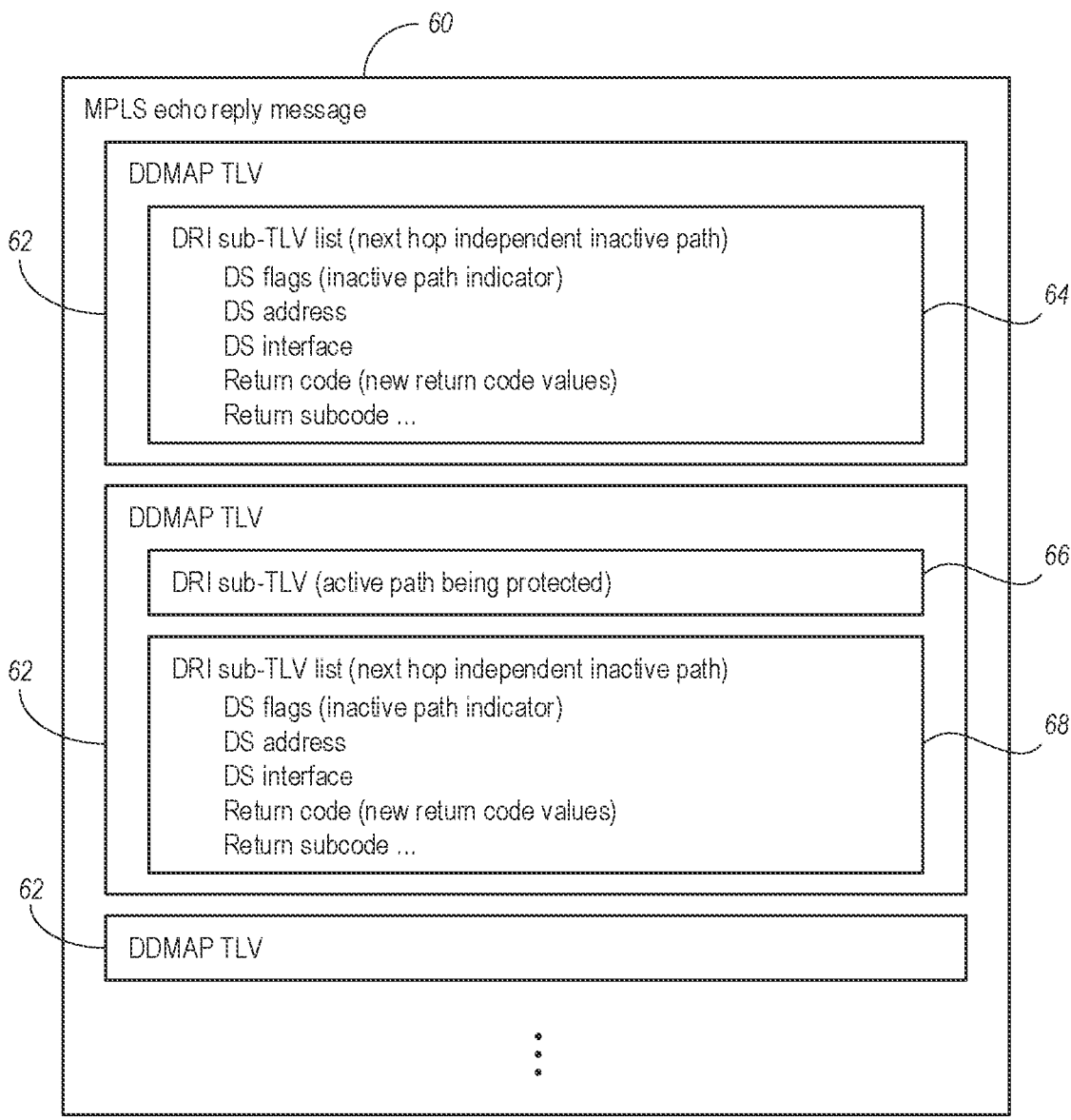
FIG. 5 is a diagram illustrating a data format of a MPLS echo reply message, according to various embodiments of the present disclosure.

In a first implementation with respect to request messages, the active/inactive path validation program 44 may be configured to create new DDMAP TLV data sets 52 in the MPLS echo request message 50. For example, the MPLS echo request message 50 may be configured to include TLV data where:
 Type: inactive paths detection and validation
 Length: 4
 Value: 0: no inactive path detection or validation
 1: detect inactive path only
 2: detect and test the inactive path
 3: detect and test the inactive path up to LSP egress point
 Padding In a second implementation with respect to request messages, the active/inactive path validation program 44 may be configured to create a new sub-TLV data set (e.g., Downstream Router and Interface (DRI) sub-TLV 54) inside the DDMAP TLV 52 of the MPLS echo request message 50. For example, the MPLS echo request message 50 may be configured to include the DRI sub-TLV 54 data where:
 Type: inactive paths and path validation
 Length: 4
 Value: 0: no inactive path detection or validation
 1: detect inactive path only
 2: detect and test the inactive path
 3: detect and test the inactive path up to LSP egress point
 Padding MPLS Echo Replies FIG. 5 is a diagram illustrating an embodiment of a data format of a MPLS echo reply message 60. Similar to the data format of the MPLS echo reply message 24 shown in FIG. 2, the MPLS echo reply message 60 of FIG. 5 includes one or more DDMAP TLV data sets 62. However, in addition to the DDMAP TLV data included in the MPLS echo reply message 24, the MPLS echo reply message 60, as described with respect to various implementations of the present disclosure, further includes new DRI sub-TLV data sets 64, 66, 68, among others. With the MPLS echo reply message 60, the systems and methods of the present disclosure are able to expand regular MPLS echo "reply" messages to report inactive paths and path validation results.

In a first implementation with respect to reply messages, the active/inactive path validation program 44 may be configured to create new TLV data sets in the MPLS echo reply message 60. This allows the expansion of the data fields with respect to DRI sub-TLV 64, 66, 68, etc. to be included inside the DDMAP TLV data sets 62. Also, in some embodiments, the data fields may be expanded such that the DRI sub-TLV data sets 64, 66, 68, etc. may themselves be allowed to be embedded sub-TLV data. For example, the MPLS echo reply message 60 may be configured to include the DRI sub-TLV 64, 66, 68 data, where:

A Downstream (DS) Flag, configured as an "inactive path indicator," can be allocated as one bit from any reserved bits, where:
   0: active path
   1: inactive path "Return code" information can be created with new enums (e.g., enumerator type having a set of named values) for the inactive path validation result, where new values can include:
   16: Path not tested
   17: Path can be reached
   18: Path unreachable Other legacy fields of DRI sub-TLV can also be used.

In a second implementation with respect to reply messages, the path validation results can be independently stored for each of the inactive paths. The inactive paths may not necessarily be associated with any specific next hop and may be stored directly under a dedicated instance of the Downstream Detailed Mapping (DDMAP) TLV. When multiple inactive paths are present, each can be added in a list:
   DDMAP TLV (e.g., DDMAP TLV 62), which may be embedded with:
      DRI sub-TLV (inactive path 1)
      DRI sub-TLV (inactive path 2)
      and so on In a third implementation with respect to reply messages, the next hop dependent inactive path (e.g., link protection path) is stored as a sub-TLV after the DRI sub-TLV of the protected next hop. According to RFC 8029, each DRI sub-TLV is normally encoded in a dedicated DDMAP TLV, so there would be no ambiguity to associate the protection path. When multiple inactive paths are present, they can be added to a list including:
   DDMAP TLV (e.g., DDMAP TLV 62), which may be embedded with:
      DRI sub-TLV (protected active path) (e.g., DRI sub-TLV 66)
      DRI sub-TLV (inactive path 1) (e.g., DRI sub-TLV 68)
      DRI sub-TLV (inactive path 2)
      and so on.

In a fourth implementation with respect to reply messages, the next hop specific inactive path can also be embedded into the DRI sub-TLV of the protected active path with path validation results. This format makes it easier for the parser to decode the data without looking up objects already parsed. When multiple inactive paths are present, they can be added in a list including:
   DDMAP TLV, which may be embedded with:
      DRI sub-TLV (protected active path), which in turn may be embedded with:
         DRI sub-TLV (inactive path 1)
         DRI sub-TLV (inactive path 2)
         and so on Referring again to FIG. 5, it may be noted that in some embodiments, the DRI sub-TLV of an inactive path can follow a regular DRI sub-TLV of the active path it protected for or, alternatively, embedded into it. LSP level protection paths which are irrelevant to each specific outgoing interface to the downstream node is treated as independent protection path. This can be backup LSPs when the LSP enters a new tunnel or segment. When independent protection paths are available, one dedicated DDMAP TLV is created to take all of the DRI sub-TLVs of independent protection path. Protection paths to each next hop specific path is filled in an inactive DRI sub-TLV after the active DRI sub-TLV which they are protecting for. In complex situations where there are multiple inactive paths for each ECMP path, there may be multiple DDMAP TLVs for each of the ECMP paths, whereby each DDMAP TLV may have one DRI sub-TLV for each ECMP path. No or any number of extended DRI sub-TLVs can be filled after each DRI sub-TLV, when applicable.

Inactive Path Types

Figure 6:
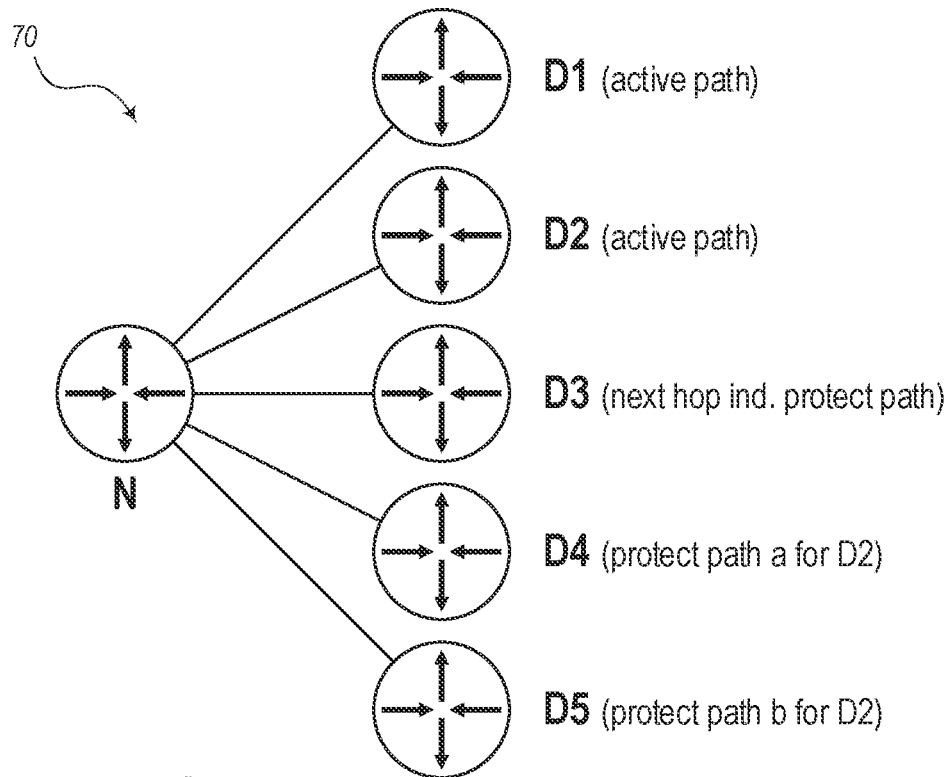
FIG. 6 is a schematic diagram illustrating next-hop paths to multiple nodes, according to various embodiments.

FIG. 6 is a schematic diagram illustrating an embodiment of an arrangement 70 where a next-hop path may lead from a head end node N to any of a number of multiple destination nodes D1, D2, D3, D4, D5. In this example, there are five destination nodes D1-D5, where D1 and D2 are active paths, D3 is a next hop independent of protect (protection) paths, D4 is a protect (protection) path "a" for D2, and D5 is a protect path "b" for D2. In this arrangement 70, the nodes N and D1-D5 may be configured as routers, switches, etc. and may be configured for inactive path detection and test operation.

Upon receiving a request to "detect" all inactive path, node N can query local data paths to retrieve all inactive paths. If there is also a request to "test" (e.g., validate) the inactive paths, node N can send a regular LSP ping to test each inactive path. The active/inactive path validation program 44 may be configured to provide a request message (e.g., the MPLS echo request message 50 of FIG. 4). In response, the active/inactive path validation program 44 may also fill a reply message (e.g., the MPLS echo reply message 60 of FIG. 5), in a transit node, and reply back to the head-end node N.

For example, with respect to FIG. 5, D1 shown in FIG. 6 may be associated with a first DRI sub-TLV (e.g., DRI sub-TLV 64) of a first DDMAP TLV 62, D2 may be associated with the DRI sub-TLV (e.g., DRI sub-TLV 68) of a third DDMAP TLV 62, and D3 may be associated with the DRI sub-TLV of a second DDMAP TLV 62 (e.g., DRI sub-TLV 68). For example, the D3 information may indicate "inactive, reachable." Also, D4 may be associated with a DRI sub-TLV that in turn is a sub-TLV of the DRI sub-TLV associated with D2, and D5 may be associated with a DRI sub-TLV that in turn is also a sub-TLV of the DRI sub-TLV associated with D2. For example, the D4 and D5 information may indicate "inactive, reachable" and "inactive, unreachable," respectively.

The next hop independent inactive paths are configured to protect the incoming traffic regardless of the active downstream paths. The next hop specific inactive path protects a specified downstream path. The number of each inactive path type can be 0, 1, or >1.

Validating Backup to the LSP Egress Point

The purpose of validating backup to the LSP egress point is not only to test whether the backup path is working, but also can make sure that it can carry traffic for the LSP to reach the expected LSP egress point. This may be done to validate whether the backup path is really protecting the active path as expected. Various embodiments may provide ways to build the MPLS echo packet header to perform this validation operation.

Figure 7:
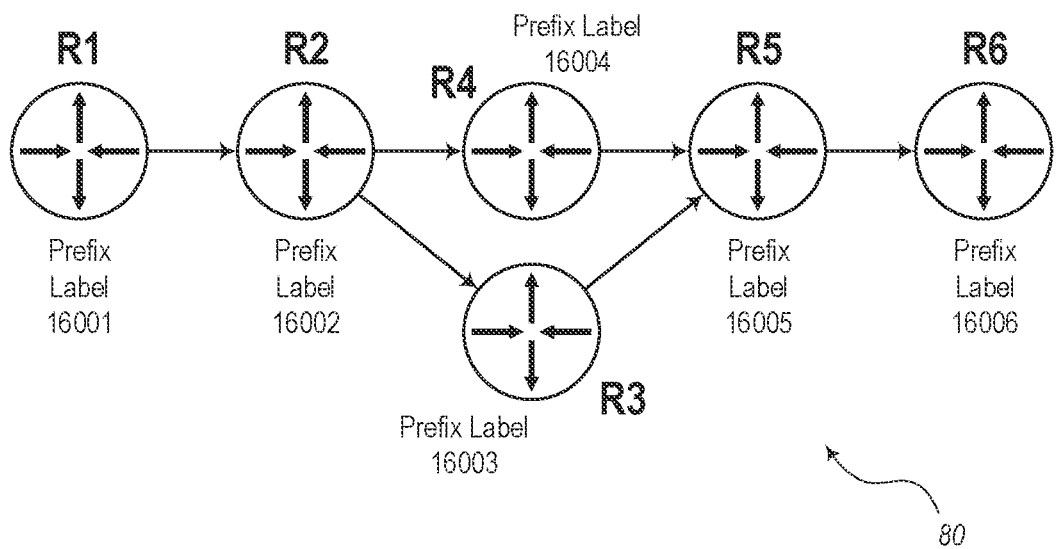
FIG. 7 is a schematic diagram illustrating an active path and an inactive path, according to various embodiments.

FIG. 7 is a schematic diagram showing an embodiment of a network 80 having a number of routers R1, R2, R3, R4, R5, R6. An active path may be formed by the sequence of routers including R1, R2, R4, R5, R6. A backup path may be formed by the sequence of routers including R1, R2, R3, R5, R6.

An MPLS header of the router R2 may receive MPLS echo request label stack {16005, 16006}. R2 active path for the first segment {16005} is {out-interface R2-R4, label stack{16005}}, where the top MPLS label is swapped from local label 16005 to label 16005 advertised by R4. R2 active path may handle data for the LSP if TTL in MPLS header is 255 {out-interface R2-R4, label stack{16005, 16006}}. R4 may pop the label 16005, swap from the local label 16006 to label 16006 advertised by R5, and transmit the packet forward to R5. R2 node protection backup path {out-interface R2-R3, label stack{21}} may be used to replace active path {out-interface R2-R4, label stack{16005}}, where label 21 is adjacency label for link R3-R5. Also, a combined path for the LSP over the backup path may include removing the active path from the received MPLS header and pushing the backup path MPLS header to the packet: {out-interface R2-R3, label stack{21, 16006}}. This may be used as the label stack in the MPLS echo request label header to validate the backup path for the LSP. This may also be the real LSP path when the active path is down, and the backup path takes over the traffic.

The MPLS ping or traceroute initiator node (e.g., R1) may be configured to encode the inactive path discovery and validation operation mode in the expanded MPLS echo request message 50 in TLV, sub-TLV, or any other format which can be decoded by downstream routers (e.g., R2-R6) and then forward the packet via the active/inactive path.

The inactive path discovery and validation operation modes may include:
no inactive path detection or validation: in this case, the whole expanded structure is optional and can be omitted, if the implementation prefers to do so;
detect inactive path only; and
detect and test the inactive path.

An LSP transit node, as an MPLS ping or traceroute responder node (e.g., R2-R6) may be configured to decode the inactive path discovery and validation operation mode from the received MPLS echo request message 50. As specified in RFC 8029, LSP transit node may query a local data path for next hop or next hop path list using the instructions from the DDMAP TLV from the received MPLS echo request message 50 and encode the query results in the DDMAP TLV list of the MPLS echo reply message 60. It may be expected that there would be no behavior changes in this step.

If the decoded inactive path detection mode includes "no inactive path detection or validation," then the process may go to the next step. If the decoded inactive path detection mode is to "detect inactive path," then the process may include the steps of a) querying local data path for global inactive paths (e.g., inactive paths which are independent to downstream next hops) of the received MPLS echo request message 50 and b) encoding the query result in an expanded MPLS echo reply message 60, where a data format may include next hop independent inactive path and path validation results. For each next hop as may be defined in DRI sub-TLV, the method may include c) querying a local data path to get all next hop dependent inactive paths and d) encoding the query result in expanded MPLS echo reply message 60, where a data format may include a next hop specific inactive path and path validation results (in plane format).

If the decoded inactive path detection mode is to detect and test the inactive path, the method may include performing all the above operations, and for each inactive path, the transit node may be configured to perform LSP ping by crafting a regular MPLS echo request message 50 in ping mode and injecting it in the inactive path to be tested. Based on the ping result, the process may include updating the return code of the corresponding inactive path DRI sub-TLV.

The MPLS ping packet to test the inactive path can be any MPLS echo request message. In some embodiments, the received MPLS echo request packet may be reused when possible. The MPLS packet may be padded to the same size of the received MPLS echo request packet and the sender IP address may be set to the current transit node's local address, such as by changing the TTL value in the MPLS label header to a local defined max TTL value for the ping request, so that the data path can be simulated more effectively.

If the decoded inactive path detection mode is to "detect and test the inactive path up to an LSP egress point," the system may be configured to perform the above operations. For each inactive path, the transit node may be configured to perform LSP ping by crafting a regular MPLS echo quest message in ping mode and injecting it in the LSP over the inactive path to be tested. Based on the ping result, the method may include updating the return code of the corresponding inactive path DRI sub-TLV.

The MPLS ping packet to test the LSP over the inactive path can be any MPLS echo request packet. In some embodiments, the received MPLS echo request packet may be reused when possible or the MPLS packet may be padded to the same size as the received MPLS echo request packet. Then, the process may include setting the sender IP address to the current transit node's local address so that the data path can be simulated more effectively.

The MPLS label head of this ping packet may follow the data path over the backup path of the received MPLS echo request packet when the TTL reaches a certain value (e.g., 255). The embodiments of the present disclosure are not limited to any preferred algorithms or implementation details of how to get the label stack for the LSP over the backup path to be tested. One example, however, is to combine the LSP's label stack from the received MPLS echo packet header (after performing ingress label pop, swap, and/or push operations), and inject the MPLS packet to the backup path. In this way, the data path can send the packet out, as shown in FIG. 7, with a combined label stack. The TTL value in the MPLS label header may be set to the local defined max TTL value for this ping request.

Furthermore, the LSP transit node may be configured to reply with the MPLS echo reply message 60 back to the ping/traceroute initiator (e.g., R1) with the inactive path information encoded. The ping/traceroute initiator may decode the inactive path information from the received MPLS echo reply message 60 and feedback the result to the NMS 30 or operator. The inactive path detection and test procedure may also apply to the head end node too. Instead of filling the echo reply message, that information can be directly fed back to the NMS 30 or operator.

The examples listed above show possible implementation alternatives. It should be noted that the various strategies, techniques, algorithms, etc. allow the systems to encode the information in any suitable ways. Also, for compatibility, the sender and receiver may agree on the same format. The procedures described herein apply to all forms of MPLS ping, traceroute, multi-path discovery (e.g., tree trace) including Command Line Interface (CLI), proxy ping and traceroute, Service Level Agreement (SLA) automated MPLS ping and traceroute, YANG/NETCONF-driven MPLS ping and traceroute, etc.

Detecting, Testing, and Validating Strategies

A. Ping Mode

Figure 8:
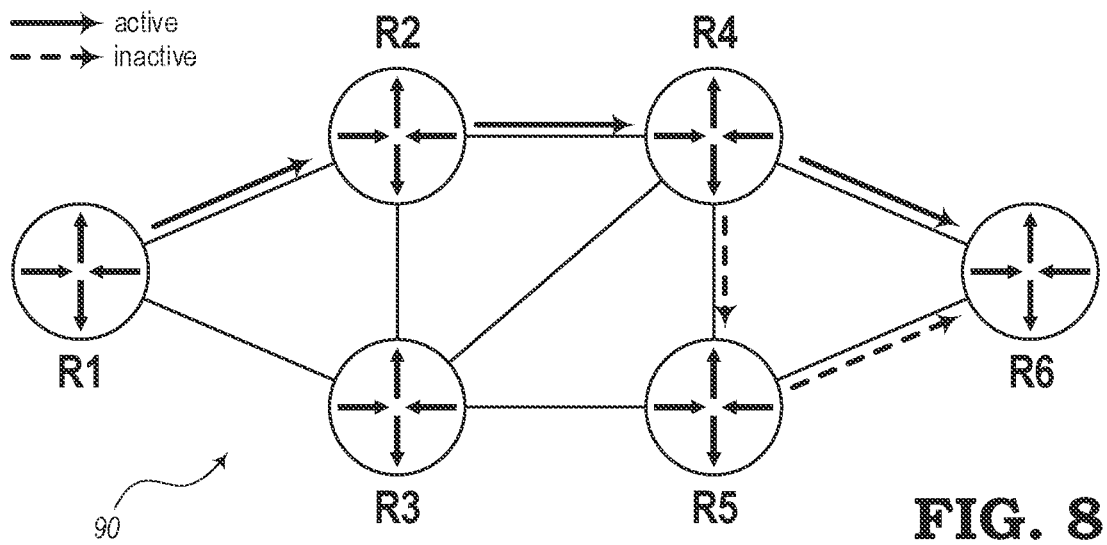
FIG. 8 is a schematic diagram illustrating a network having an active path and multiple inactive paths and illustrating a process for validating the inactive paths in an LSP ping mode, according to various embodiments.

FIG. 8 shows a first use case regarding a "ping" mode. Thus, the systems may detect and validate an inactive (protection) path in LSP ping mode. FIG. 8 is a schematic diagram illustrating a network 90 having an active path (R1-R2-R4-R6) and one inactive path (R4-R5-R6). Other backup paths may be available. With this network 90, a process for validating the inactive paths in the LSP ping mode in described below.

From R1 MPLS ping, a LSP with a given TTL value is used to check the path protection from the specified hop. For example, the MPLS ping LSP to R6 (TTL=2) inactive path test may include setting TTL=2 and making the packet being handled by the second hop node R4. An "inactive path test" may be requested that hops to detect and test inactive path (R4-R5-R6) for the LSP to R6. As an example, CLI options may allow a user to select an "inactive-path test" option or an "inactive-path detect" option. It may be noted that these actions may be extensions to RFC 8029.

According to one process using the network 90, the following steps may be performed:

1. R1 sends an echo request (e.g., MPLS echo request message 50) with a label head TTL=2, "inactive-path detection" selection, and a validation sub-TLV value of 2 (e.g., TTL=2);
2. After two hops, the packet may be punted at R4;
3. R4 can locally detect all protection paths. In this example, facility bypass tunnel R4-R5-R6 can be used as an inactive (protection) link for the segment R4-R6, as needed;
4. R4 sends the LSP ping to the facility bypass tunnel R4-R5-R6 and waits for results;
5. R4 also replies to R1 with the detected inactive path information and test results in the DRI sub-TLV field inside the DDMAP TLV {DDMAP {DRI R4-R6}, {inactive DRI R4-R5-R6, reachable}, . . . }; and
6. R1 reads the MPLS echo reply message 60 and may present the results to a user or network operator.

In this embodiment, the processes may include creating a new MPLS echo return code for the inactive path test results. Also, in the ping mode, the embodiments may use TTL to limit the MPLS ping mode to detect and test all inactive LSPs for a given hop number. When multiple inactive paths are present, for example, the process may include detecting and reporting all inactive paths and use the format shown in FIG. 5 with respect to the second, third, and fourth implementations.

The process may be initiated by the headend (R1) router. When the headend does not implement this functionality, a transit node and/or egress node (R6), which may also be configured with this functionality, can perform LSP ping, traceroute, and/or multipath discovery. For example, if R1 does not have this functionality but R4 does, then R1 can send a legacy MPLS echo request packet, which both nodes can understand. When an inactive path tail-end does not have this functionality, some embodiments may include performing the functions as described above up until the starting point of the inactive path. At this point, the starting node (router) can detect the inactive path status on request from the headend and reply with the results. In another case, if R6 does not have this functionality, R4 can still detect the inactive path R4-R5-R6 and reply with the test results to R1.

B. Traceroute Mode

Figure 9:
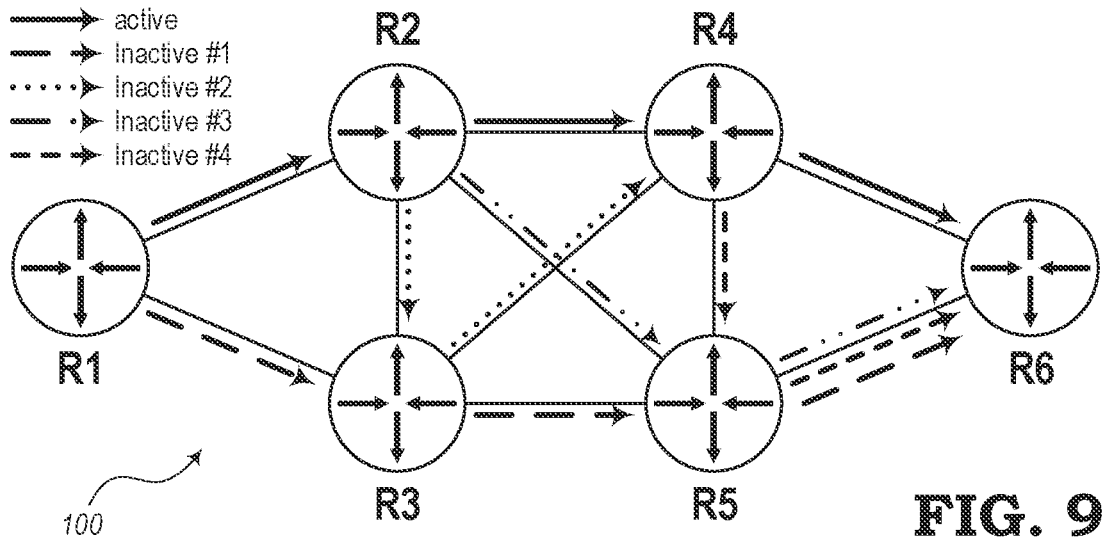
FIG. 9 is a schematic diagram illustrating the network of FIG. 8 and a process for validating the inactive paths in an LSP traceroute mode, according to various embodiments.

FIG. 9 shows the same arrangement of routers R1-R6 in a network 100 to detect and validate inactive (protection) paths in LSP traceroute mode. From R1, the MPLS system may be configured to perform a traceroute process for tracing a LSP to check the path protection for each hop. MPLS traceroute LSP may be configured to perform an inactive path test to R6. The user may provide an "inactive-path test" request for each hop to detect and test local inactive paths for the LSP to R6. In this way, it may be possible to discover and test all possible inactive protection paths.

With an active path including R1-R2-R4-R6, the traceroute process may include the steps of:

1. R1 can locally detect a backup LSP as R1-R3-R5-R6 as a first inactive path for the LSP;
2. R1 can provide an LSP ping of the first backup LSP R1-R3-R5-R6 and wait for results;
3. R1 shows a hop of 0 result for both the active path and the first inactive path;
4. R1 sends echo request with a label head TTL=1, "inactive paths detection and validation" selected, and sub-TLV value of 2;
5. The packet can be punted at R2;
6. R2 locally detects all protection path, whereby, in this example, the user may configure a second backup tunnel R2-R3-R4 and a third backup tunnel R2-R5-R6;
7. R2 sends a ping to the second and third facility bypass tunnels R2-R3-R4 and R2-R5-R6 and waits for results;
8. R2 replies to R1 with the detected inactive path information and test results for both protection paths in DRI sub-TLVs inside a DDMAP TLV {DDMAP {inactive DRI R2-R3-R4, reachable}, {inactive DRI R2-R5-R6, reachable}, . . . };
9. R1 reads the echo reply message and show the results of hop 1 for the active path and the first, second, and/or third inactive paths;
10. R1 sends echo request with a label head TTL=2, "inactive paths detection and validation" selection, and sub-TLV value 2;
11. The packet along the active path is punted at R4;
12. R4 locally detects all protection paths at this point, which, in this example, may include a fourth facility bypass tunnel R4-R5-R6 that is configured as a protection link for R4-R6;
13. R4 sends an LSP ping to the facility bypass tunnel R4-R5-R6 and waits for results;
14. R4 replies to R1 with the detected inactive path info and test results {DDMAP {DRI R4-R6}, {inactive DRI R4-R5-R6, reachable}, . . . };
15. R1 reads the echo reply message and shows the result of hop 2 to a user for the active path and the first, second, third, and/or fourth inactive paths;
16. R1 sends an echo request with a label head TTL=3, "inactive paths detection and validation" selection, and sub-TLV value 2;
17. The packet after three hops along the active path is punted at R6;
18. R6 is detected as the egress node;
19. R6 replies to R1 as a regular traceroute operation; and
20. R1 reads the echo reply message and shows the hop 3 results and end traceroute.

The network 100 is used to perform the LSP traceroute procedures for validating the four different inactive paths that are shown in FIG. 9. In the traceroute mode, the procedures can detect and test all inactive LSPs for every hop along the forwarding active path. When multiple inactive paths are present from any hop (e.g., as shown in FIG. 9), it is possible to detect and report some or all of them at the hops. For example, the processes may use the format described above with respect to the second, third, and fourth implementations of FIG. 5.

When the headend R1 is configured with the functionality described herein and a transit node (e.g., R2 or R4) does not support this functionality, the procedure may include replying with MPLS echo reply return code (2). One or more of the TLVs may not be understood. This gives the headend R1 a signal that the transit node does not support this feature. Thus, functionality may be left up to the implementation details of the head end itself either to resend another MPLS echo request without this feature or ignore the error from this node and continue.

An example may be considered when R1 is implemented with these embodiments, but R2 does not have this functionality. In this case, when R2 receives a MPLS echo request with "inactive paths detection and validation" selection, and unrecognizable sub-TLVs, R2 may send MPLS echo reply with a return code (2) to R1. At this point, it may be up to the R1 to either resend another MPLS echo request without the TLV, which may not be supported by R2, or ignore the error and continue the traceroute procedure to the next hop.

C. Multi-Path Discovery Mode

Figure 10:
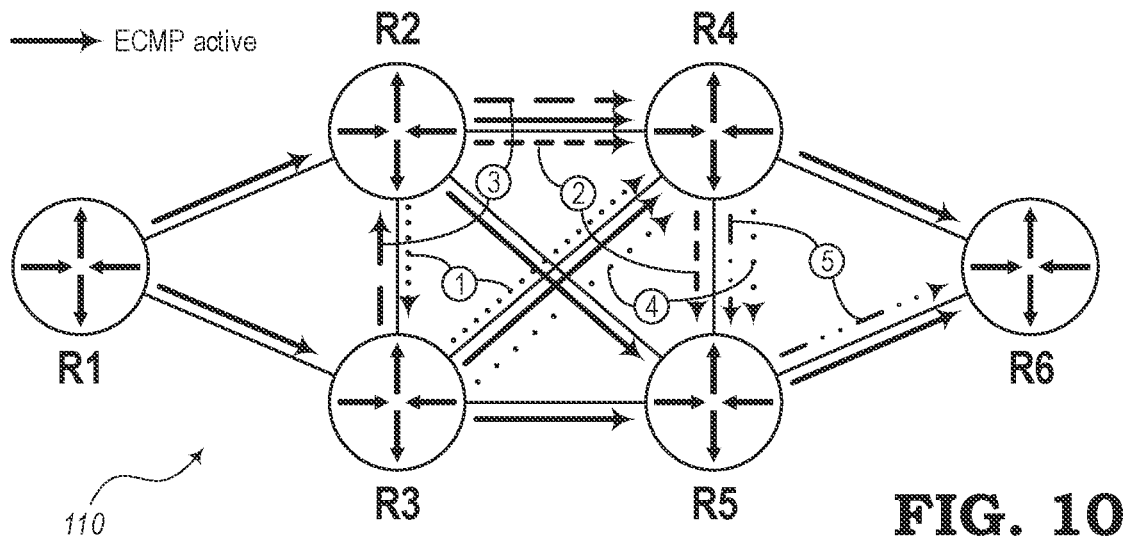
FIG. 10 is a schematic diagram illustrating the network of FIG. 8 and a process for validating the inactive paths in an LSP multi-path discovery mode, according to various embodiments.

FIG. 10 is a schematic diagram illustrating a network 110 having the same arrangement as shown in FIG. 8. However, a process for validating the inactive paths in an LSP multi-path discovery mode is used as a third implementation. It may be possible to detect and validate protection paths in an Equal-Cost Multi-Path (ECMP) LSP multi-path discovery mode (e.g., tree trace).

From R1, an MPLS traceroute may be sent along a LSP to find all ECMP paths and check the path protection for each hop in each ECMP branch. An MPLS traceroute multi-path LSP to R6 inactive path test may be performed, where a user may select a "multi-path" request traceroute to perform multipath discovery. ECMP discovery procedures may substantially follow the definition in RFC 8029. An "inactive-path test" may be requested at each hop to detect and test local inactive path for the LSP to R6, in order to discover and test all possible inactive protection paths. To simplify the diagram, not all protection paths are shown, but only the applicable protection paths for some of the nodes.

In this arrangement, the network 110 may be used to perform the multi-path procedure. Four different active paths may be selected with equal costs (based on hops). A first active path may include routers R1-R2-R4-R6. A second active path may include routers R1-R2-R5-R6. A third active path may include routers R1-R3-R4-R6. Also, a fourth active path may include routers R1-R3-R5-R6. From these four paths, one may be selected as an active path (using other criteria other than hop count) and the other three may be designated as protection paths. In this embodiment, the procedure for performing multi-path discovery may include the steps of:

1. R1 locally detects the ECMP path to downstream nodes, a path to R2, and a path to R3;

2. R1 sends an echo request with a label head TTL=1, with a load balance factor in IP header or MPLS entropy labeled to reach branch R2, an "inactive paths detection and validation" selection, a sub-TLV value of 2;

3. The packet may be punted at R2 after this one hop;

4. R2 locally detects all ECMP paths—paths R2-R4 and R2-R5;

5. R2 detects all inactive paths, with no next hop independent protection path, where a first inactive TI-LFA link protection path R2-R3-R4 can be used for protection for path R2-R4 and a second inactive TI-LFA link protection path R2-R4-R5 can be used for protection for path R2-R5;

6. R2 sends LSP ping to the first and second TI-LFA protection paths R2-R3-R4 and R2-R4-R5 and waits for results;

7. R2 replies to R1 with all the detected inactive path info and test results under corresponding ECMP paths being protected in embedded DRI sub-TLV inside the DRI sub-TLV of the protected paths, which may be embed inside each DDMAP TLV: {DDMAP {DRI R2-R4}, {inactive DRI R2-R3-R4, reachable}, . . . }, {DDMAP {DRI R2-R5}, {inactive DRI R2-R4-R5, reachable}, . . . };

8. R1 sends echo request with a label head TTL=1, with load balance factor in IP header or MPLS entropy label to reach branch R3, with "inactive paths detection and validation" selected, and sub-TLV value of 2;

9. The packet may be punted at R3;

10. R3 locally detects all ECMP paths, R3-R4 and R3-R5;

11. R3 detects all inactive paths, with no next hop independent protection path, and a third TI-LFA link protection path R3-R2-R4 for protecting path R3-R4 and a fourth TI-LFA link protection path R3-R4-R5 for protecting path R3-R5;

12. R3 sends LSP ping to TI-LFA protection path R3-R2-R4 and R3-R4-R5 and waits for results: {DDMAP {DRI R3-R4}, {inactive DRI R3-R2-R4, reachable}, . . . }, {DDMAP {DRI R3-R5}, {inactive DRI R3-R4-R5, reachable}, . . . };

13. R3 replies to R1 with the detected inactive path info and test results for both the third and fourth backup paths with corresponding ECMP paths being protected (similar as step 7);

14. R1 sends echo request with a label head TTL=2, with load balance factor in IP header or MPLS entropy label to reach branch R4 via R2, with "inactive paths detection and validation" selected, and sub-TLV value of 2;

15. The packet is punted at R4;

16. R4 locally detects all ECMP paths, where only one path R4-R6 is found;

17. R4 detects all inactive paths, where a fifth TI-LFA link protection path R4-R5-R6 can be used for protection for path R4-R6;

18. R4 sends LSP ping to TI-LFA protection path R4-R5-R6 and waits for results: {DDMAP {DRI R4-R6}, {inactive DRI R4-R5-R6, reachable}, . . . };

19. R4 replies to R1 with the detected inactive path info and test result for the fifth backup path under corresponding ECMP paths being protected (similar as step 7);

20. R1 sends echo req with a label head TTL=3, with load balance factor in IP header or MPLS entropy label to reach branch R6 via R2 and R4, "inactive paths detection and validation" selected, and sub-TLV value of 2;

21. The packet is punted at R6;

22. R6 is detected as the egress node;

23. R6 replies to R1 as regular traceroute operation; and

24. R1 reads the echo reply message, organizes path data, and shows the traversed LSP branch, where, for each hop, the information of the active path and the multiple inactive paths is shown.

In another embodiment, the procedure may follow similar steps to step 14 to 24 to traverse ECMP branches R1-R2-R5-R6, R1-R3-R4-R6, R1-R3-R5-R6, and get hop by hop inactive paths detected and tested for all of them.

In LSP ECMP multipath discovery mode, the solution can detect and test all inactive LSPs for every hop along the forwarding path of every ECMP path. When multiple inactive paths are present from any hop, the procedure may include detecting and reporting all of them for these hops. For example, the procedure may use the format of the second, third, and fourth implementations described with respect to FIG. 5.

The active ECMP multipath discovery may be driven by procedures defined in RFC8029, with the modifications described herein. The implementations can optionally optimize this procedure by requesting each node to only detect, validate, and report the backup path once. Then, when the node appears multiple times in multiple ECMP paths, the process can reduce redundant backup path detection and validation operations.

The embodiments of the present disclosure are not limit to any preferred methodology or algorithms for how to identify the redundant operations. In one example, when the ping or traceroute headend node finds the same transit node has already performed the desired operation, it can either send a regular MPLS echo request to that node without requesting it to do backup path detection or validation, or explicitly sets the inactive paths and path validation sub-TLV value to "no inactive path detection or validation" in the MPLS echo request packet sent to that node, in order to reduce unnecessary detection and validation operations.

Sample of Multi-Path Discovery Mode Results

With the multi-path discovery process (e.g., tree trace mode) described with respect to FIG. 10 is executed for detecting and validating protection paths, the following results may be obtained:

Branch 1:
Hop 0: R1, active path downstream R1-R2
Hop 1: R2, active path downstream R2-R4
protection path for R2-R4: R2-R3-R4 reachable
Hop 2: R4, active path downstream R4-R6
protection path for R4-R6: R4-R5-R6 reachable
Hop 3: R6 egress
Branch 2:
Hop 0: R1 local info to R2
Hop 1: R2, active path downstream R2-R4
protection path for R2-R4: R2-R3-R4 reachable
Hop 2: R5, active path downstream R5-R6
protection path for R5-R6: R5-R4-R6 reachable
Hop 3: R6 egress
Branch 3:
Hop 0: R1, active path downstream R1-R3
Hop 1: R3, active path downstream R3-R4
protection path for R3-R4: R3-R2-R4 reachable
Hop 2: R4, active path downstream R4-R6
protection path for R4-R6: R4-R5-R6 reachable
Hop 3: R6 egress
Branch 4:
Hop 0: R1, active path downstream R1-R3
Hop 1: R3, active path downstream R3-R5
protection path for R3-R5: R2-R3-R4 reachable
Hop 2: R5, active path downstream R5-R6
protection path for R5-R6: R5-R4-R6 reachable
Hop 3: R6 egress As we can see from these examples, a network operator may easily recognize the LSP hop by hop protection status for all possible paths with one CLI command.

Inactive Path Validation Process

Figure 11:
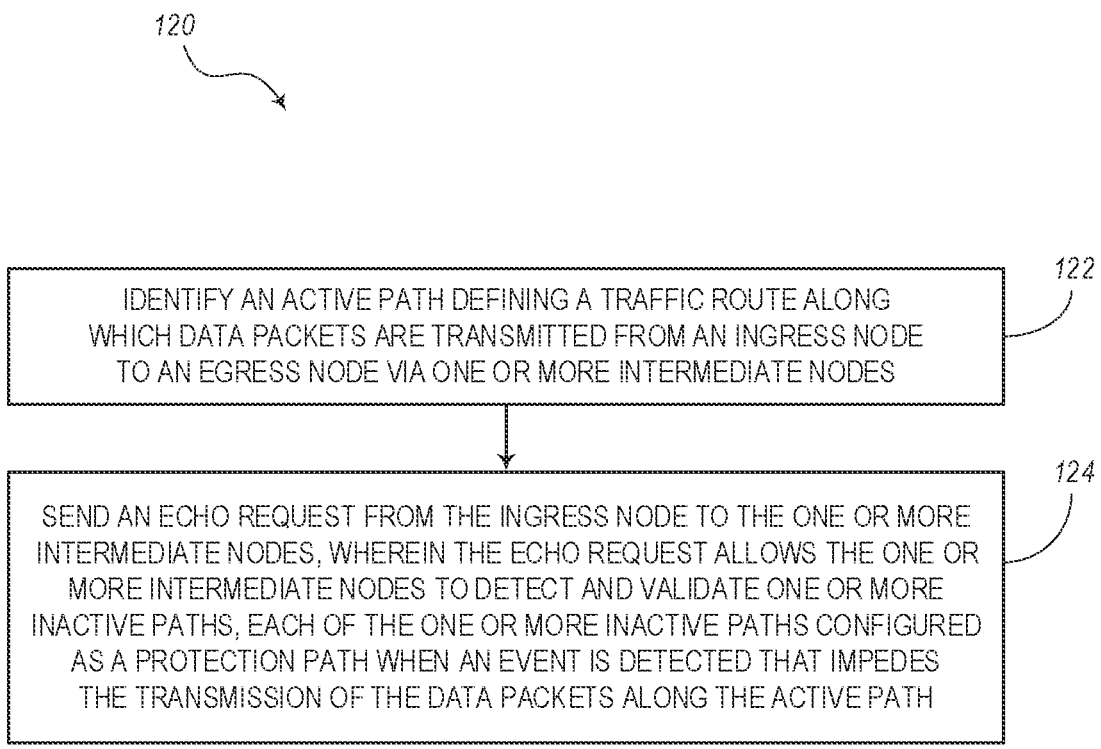
FIG. 11 is a flow diagram illustrating a process for validating inactive paths in an MPLS network, according to various embodiments.

FIG. 11 is a flow diagram illustrating an embodiment of a process 120 for validating inactive paths in an MPLS network. In this embodiment, the process 120 includes identifying an active path defining a traffic route along which data packets are transmitted from an ingress node to an egress node via one or more intermediate nodes, as indicated in block 122. The process 120 also includes sending an echo request from the ingress node to the one or more intermediate nodes, as indicated in block 124, wherein the echo request allows the one or more intermediate nodes to detect and validate one or more inactive paths, the one or more inactive paths configured as one or more protection paths when an event is detected that impedes the transmission of the data packets along the active path.

According to some embodiments, the process 120 may be executed whereby the active path and one or more inactive paths are configured as Label Switched Paths (LSPs) in a Multiprotocol Label Switched (MPLS) network. In this case, validating the one or more inactive paths may be part of an LSP Validation (LSPV) process. The echo request may be configured to request the one or more intermediate nodes to perform a) an MPLS ping procedure, b) an MPLS traceroute procedure, or c) an MPLS multi-path discovery procedure. The echo request may also include a Time to Live (TTL) value to identify a specific intermediate node at which detection and validation procedures are performed for detecting and validating an inactive path of the one or more inactive paths.

Also, the process 120 may be configured to include the step of receiving an echo reply back from the one or more intermediate nodes. The echo reply may include one or more Downstream Detailed Mapping (DDMAP) fields having Type, Length, Value (TLV) data sets and one or more Downstream Router and Interface (DRI) sub-TLV data sets embedded in each of the DDMAP TLV data sets. Also, the DRI sub-TLV data sets may include a Downstream (DS) flag designated as an inactive path indicator. The DRI sub-TLV data sets may also include return code values related to validation results of an inactive path validation test.

Furthermore, the process 120 may be processed according to RFC 8029 and more particularly as an extension of RFC 8029 to enable the detection and validation of the one or more inactive paths. For example, the detection and validation of the one or more inactive paths may be triggered at the ingress node or alternatively at one of the intermediate nodes. The ingress node, egress node, and one or more intermediate nodes may be configured as routers.

Legacy LSP ping/traceroute processes in MPLS networks can validate active data path only. However, an advantage of the embodiments of the present disclosure is that systems and methods are provided to validate both an active path and one or more inactive paths. Thus, a network operator can make sure the protection path can really be used for protection when the active path is broken, unavailable, or impeded in some other way. The present disclosure provides a way to automatically detect and validate all possible protection segments from the LSP head end, without going to each transit nodes individually.

The methodologies of the present disclosure may be configured as an extension or expansion of RFC 8029 to allow additional data to be injected in the MPLS echo request messages used by ping, traceroute, or multi-path (e.g., ECMP, tree trace, etc.) procedures. These procedures can instruct a specific node in the LSP to discover and report local inactive paths via a new data field in the MPLS echo reply message so that the inactive path can be tested from the ping or traceroute initiator. Thus, the methodologies can be incorporated into LSP and MPLS standards to allow consistency in the detection and validation of all paths, not just the active paths. Otherwise, with nodes and routers from different vendors, some nodes may be unable to understand and implement the new aspects regarding the processing of inactive paths. Nevertheless, the systems and methods described herein can still operate as intended, even with unparticipating nodes.

As a result, various benefits may be realized over the conventional systems, as should be understood from the present disclosure. One benefit, for example, may be an improvement in the MPLS network diagnosis tools to auto-detect all backup path network errors from the LSP head end node. Also, the present disclosure may improve MPLS network reliability, help detect and recover potential networks problems before it is put into service, which might otherwise have negative consequences.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A Network Management System (NMS) comprising:
a processing device with at least one processor, and
a memory device configured to store a computer program having instructions that, when executed, enable the processing device to
identify an active path defining a traffic route along which data packets are transmitted from an ingress node to an egress node via one or more intermediate nodes,
cause an echo request to be sent from the ingress node to the one or more intermediate nodes, wherein the echo request allows the one or more intermediate nodes to detect and validate one or more inactive paths, each of the one or more inactive paths configured as a protection path, and
receive results of an echo reply originated by the one or more intermediate nodes, wherein the echo request and the echo reply are defined in Request for Comments 8029 (RFC 8029), and wherein the echo reply includes data in Type, Length, Value (TLV) data sets for detection and validation of the one or more inactive paths,
wherein the echo reply includes one or more Downstream Detailed Mapping (DDMAP) fields having TLV data sets and one or more Downstream Router and Interface (DRI) sub-TLV data sets embedded in each of the DDMAP TLV data sets, and
wherein one or more of the DRI sub-TLV data sets include a Downstream (DS) flag designated as an inactive path indicator, and the DRI sub-TLV data sets include return code values related to validation results of an inactive path validation test.

2. The NMS of claim 1, wherein the active path and one or more inactive paths are Label Switched Paths (LSPs) in a Multiprotocol Label Switched (MPLS) network, and wherein validating the one or more inactive paths is part of an LSP Validation (LSPV) process.

3. The NMS of claim 2, wherein the echo request is configured to request the one or more intermediate nodes to perform one of an MPLS ping procedure, an MPLS traceroute procedure, and an MPLS multi-path discovery procedure.

4. The NMS of claim 1, wherein the echo request includes a Time to Live (TTL) value to identify a specific intermediate node at which detection and validation procedures are performed for detecting and validating an inactive path of the one or more inactive paths.

5. The NMS of claim 1, wherein the instructions include an extension of the Request for Comments 8029 (RFC 8029) to enable the processing device to detect and validate the one or more inactive paths.

6. The NMS of claim 1, wherein detection and validation of the one or more inactive paths and validation of the inactive path's capability to protect the active path is triggered at the ingress node or at an intermediate node of the one or more intermediate nodes.

7. The NMS of claim 1, wherein the ingress node, the egress node, and the one or more intermediate nodes are configured as routers.

8. A non-transitory computer-readable medium configured to store computer logic having instructions that, when executed, cause one or more processing devices to:
identify an active path defining a traffic route along which data packets are transmitted from an ingress node to an egress node via one or more intermediate nodes,
cause an echo request to be sent from the ingress node to the one or more intermediate nodes, wherein the echo request allows the one or more intermediate nodes to detect and validate one or more inactive paths, each of the one or more inactive paths configured as a protection path, and
receive results of an echo reply originated by the one or more intermediate nodes, wherein the echo request and the echo reply are defined in Request for Comments 8029 (RFC 8029), and wherein the echo reply includes data in Type, Length, Value (TLV) data sets for detection and validation of the one or more inactive paths,
wherein the echo reply includes one or more Downstream Detailed Mapping (DDMAP) fields having TLV data sets and one or more Downstream Router and Interface (DRI) sub-TLV data sets embedded in each of the DDMAP TLV data sets, and
wherein one or more of the DRI sub-TLV data sets include a Downstream (DS) flag designated as an inactive path indicator, and the DRI sub-TLV data sets include return code values related to validation results of an inactive path validation test.

9. The non-transitory computer-readable medium of claim 8, wherein the active path and one or more inactive paths are Label Switched Paths (LSPs) in a Multiprotocol Label Switched (MPLS) network, and wherein validating the one or more inactive paths is part of an LSP Validation (LSPV) process.

10. The non-transitory computer-readable medium of claim 9, wherein the echo request is configured to request the one or more intermediate nodes to perform one of an MPLS ping procedure, an MPLS traceroute procedure, and an MPLS multi-path discovery procedure.

11. The non-transitory computer-readable medium of claim 8, wherein the echo request includes a Time to Live (TTL) value to identify a specific intermediate node at which detection and validation procedures are performed for detecting and validating an inactive path of the one or more inactive paths.

12. A method comprising the steps of:
identifying an active path defining a traffic route along which data packets are transmitted from an ingress node to an egress node via one or more intermediate nodes,
sending an echo request from the ingress node to the one or more intermediate nodes, wherein the echo request allows the one or more intermediate nodes to detect and validate one or more inactive paths, each of the one or more inactive paths configured as a protection path, and
receiving an echo reply back from the one or more intermediate nodes, wherein the echo request and the echo reply are defined in Request for Comments 8029 (RFC 8029), and wherein the echo reply includes data in Type, Length, Value (TLV) data sets for detection and validation of the one or more inactive paths, wherein the echo reply includes one or more Downstream Detailed Mapping (DDMAP) fields having TLV data sets and one or more Downstream Router and Interface (DRI) sub-TLV data sets embedded in each of the DDMAP TLV data sets, and wherein one or more of the DRI sub-TLV data sets include a Downstream (DS) flag designated as an inactive path indicator, and the DRI sub-TLV data sets include return code values related to validation results of an inactive path validation test.

13. The method of claim 12, wherein the active path and one or more inactive paths are Label Switched Paths (LSPs) in a Multiprotocol Label Switched (MPLS) network, wherein validating the one or more inactive paths is part of an LSP Validation (LSPV) process, and wherein the echo request is configured to request the one or more intermediate nodes to perform one of an MPLS ping procedure, an MPLS traceroute procedure, and an MPLS multi-path discovery procedure.

14. The method of claim 12, wherein, to validate one or more inactive paths, an extension of the Request for Comments 8029 (RFC 8029) is used.

15. The method of claim 12, wherein detection and validation of the one or more inactive paths is triggered at the ingress node or at an intermediate node of the one or more intermediate nodes, and wherein the ingress node, egress node, and one or more intermediate nodes are configured as routers.

* * * * *